United States Patent
Huang

(10) Patent No.: US 11,142,196 B2
(45) Date of Patent: Oct. 12, 2021

(54) LANE DETECTION METHOD AND SYSTEM FOR A VEHICLE

(71) Applicants: DENSO International America, Inc., Southfield, MI (US); DENSO CORPORATION, Aichi-pref. (JP)

(72) Inventor: Minglei Huang, Novi, MI (US)

(73) Assignees: DENSO INTERNATIONAL AMERICA, INC., Southfield, MI (US); DENSO CORPORATION, Aichi-Pref. (JP)

( * ) Notice: Subject to any disclaimer, the term of this patent is extended or adjusted under 35 U.S.C. 154(b) by 363 days.

(21) Appl. No.: 16/266,095

(22) Filed: Feb. 3, 2019

(65) Prior Publication Data

US 2020/0247406 A1 Aug. 6, 2020

(51) Int. Cl.
*B60W 30/12* (2020.01)
*G05D 1/02* (2020.01)
*G05D 1/00* (2006.01)

(52) U.S. Cl.
CPC ........... *B60W 30/12* (2013.01); *G05D 1/0088* (2013.01); *G05D 1/0212* (2013.01); *B60W 2552/00* (2020.02); *B60W 2554/00* (2020.02); *G05D 2201/0213* (2013.01)

(58) Field of Classification Search
None
See application file for complete search history.

(56) References Cited

U.S. PATENT DOCUMENTS

| | | | |
|---|---|---|---|
| 7,809,506 B2 | 10/2010 | Kuge et al. | |
| 9,487,235 B2* | 11/2016 | Bajpai | B62D 6/00 |
| 9,625,910 B2* | 4/2017 | Choi | B62D 15/0255 |
| 9,829,888 B2* | 11/2017 | Reiff | G06K 9/00798 |
| 10,315,651 B2* | 6/2019 | Fiaschetti | B60W 30/12 |
| 10,407,047 B2* | 9/2019 | Johnson | B60W 10/18 |
| 2004/0164851 A1* | 8/2004 | Crawshaw | B60Q 9/008 |
| | | | 340/435 |
| 2005/0131590 A1* | 6/2005 | Kuge | B60W 50/16 |
| | | | 701/1 |
| 2006/0145827 A1* | 7/2006 | Kuge | B62D 6/007 |
| | | | 340/439 |
| 2008/0055192 A1* | 3/2008 | Nagano | G02B 27/01 |
| | | | 345/7 |
| 2013/0190985 A1* | 7/2013 | Nakano | B62D 15/025 |
| | | | 701/41 |

(Continued)

Primary Examiner — Jonathan M Dager
(74) Attorney, Agent, or Firm — Burris Law, PLLC

(57) ABSTRACT

The present disclosure is directed toward a lane detection method. The method includes: acquiring road information for a section of a road upon which a subject vehicle is traveling, determining whether an adjacent vehicle is traveling in vicinity of the subject vehicle, defining, in response to determining the presence of the adjacent vehicle, a vehicle trajectory based on movement of the adjacent vehicle and the road information, detecting one or more lane markings along the road upon which the subject vehicle is traveling, defining a lane marking trajectory in response to detecting the one or more lane markings, calculating a lane accuracy for each estimated lane trajectory that includes the vehicle trajectory, the lane marking trajectory, or a combination thereof, and selecting a drive lane from among the estimated lane trajectories based on the lane accuracy.

18 Claims, 7 Drawing Sheets

(56) References Cited

U.S. PATENT DOCUMENTS

| | | | | |
|---|---|---|---|---|
| 2013/0231830 A1* | 9/2013 | Van Dan Elzen | B60W 10/04 | 701/42 |
| 2014/0052340 A1* | 2/2014 | Bajpai | B62D 6/00 | 701/42 |
| 2015/0142207 A1* | 5/2015 | Flehmig | G01C 21/3492 | 701/1 |
| 2015/0266422 A1* | 9/2015 | Chundrlik, Jr. | G06K 9/00798 | 348/148 |
| 2016/0046290 A1* | 2/2016 | Aharony | B60W 10/20 | 701/41 |
| 2016/0162743 A1* | 6/2016 | Chundrlik, Jr. | G01S 13/931 | 348/148 |
| 2016/0325682 A1* | 11/2016 | Gupta | G06K 9/00798 | |
| 2016/0327402 A1* | 11/2016 | Funabiki | G01C 21/365 | |
| 2017/0008521 A1* | 1/2017 | Braunstein | G01C 21/32 | |
| 2017/0032196 A1* | 2/2017 | Gupta | G06K 9/00798 | |
| 2017/0108863 A1* | 4/2017 | Chundrlik, Jr. | B60W 50/0205 | |
| 2017/0236422 A1* | 8/2017 | Naka | B60W 30/12 | 701/301 |
| 2017/0262712 A1* | 9/2017 | Chundrlik, Jr. | G08G 1/166 | |
| 2018/0093709 A1* | 4/2018 | Oguro | B60W 30/12 | |
| 2018/0237008 A1* | 8/2018 | Matsumura | B62D 15/025 | |
| 2018/0253630 A1* | 9/2018 | Tamer | H04N 5/228 | |
| 2018/0297638 A1* | 10/2018 | Fujii | B60W 30/12 | |
| 2019/0009819 A1* | 1/2019 | Ishioka | B60W 30/10 | |
| 2019/0072970 A1* | 3/2019 | Izumori | G05D 1/0257 | |
| 2019/0084561 A1* | 3/2019 | Takeda | B60W 30/14 | |
| 2019/0315348 A1* | 10/2019 | Mimura | G01C 21/3632 | |
| 2019/0359209 A1* | 11/2019 | Mizutani | B60W 30/12 | |
| 2019/0359228 A1* | 11/2019 | Banno | B60W 40/072 | |
| 2019/0384294 A1* | 12/2019 | Shashua | G05D 1/0088 | |
| 2020/0001788 A1* | 1/2020 | Chundrlik, Jr. | G01S 19/39 | |
| 2020/0307595 A1* | 10/2020 | Kato | B60W 30/16 | |
| 2020/0331476 A1* | 10/2020 | Chen | G05D 1/0088 | |

* cited by examiner

LANE DETECTION METHOD AND SYSTEM FOR A VEHICLE

FIELD

The present disclosure relates to lane detection system for a vehicle.

BACKGROUND

The statements in this section merely provide background information related to the present disclosure and may not constitute prior art.

A lane detection system is commonly used to define a lane along which a vehicle is traveling (i.e., travel lane or drive lane). The lane detection system can work in association with a lane departure warning system to notify the driver when the vehicle is drifting or departing from the defined drive lane, and with a vehicle autonomous control system to control the position of the vehicle within the defined drive lane.

Typically, the lane detection system defines the drive lane based on lane markings disposed along the road. However, in many instances the lane markings may not be detectable by the lane detection system. For example, the lane markings may be faded, or hidden under other vehicles, or may not be present (e.g., intersection may not have lane markings).

SUMMARY

This section provides a general summary of the disclosure, and is not a comprehensive disclosure of its full scope or all of its features.

In one form, the present disclosure is directed toward a lane detection method. The method includes: acquiring road information for a section of a road upon which a subject vehicle is traveling; determining whether an adjacent vehicle is traveling in vicinity of the subject vehicle; defining, in response to determining the presence of the adjacent vehicle, a vehicle trajectory based on movement of the adjacent vehicle and the road information; detecting one or more lane markings along the road upon which the subject vehicle is traveling; defining a lane marking trajectory in response to detecting the one or more lane markings; calculating a lane accuracy for each of one or more estimated lane trajectories, where the one or more estimated lane trajectories includes the vehicle trajectory, the lane marking trajectory, or a combination thereof; and selecting a drive lane from among the one or more estimated lane trajectories based on the lane accuracy.

In another form, the lane detection method further includes determining a location of the subject vehicle. The road information is acquired from a road map repository based on the location of the subject vehicle.

In yet another form, the lane detection method further includes monitoring a position of the subject vehicle within the drive lane to determine whether the subject vehicle departs from the drive lane.

In one form, the lane detection method further includes controlling position of the subject vehicle within the drive lane.

In another form, the calculating the lane accuracy further includes: calculating, for each of the one or more estimated lane trajectories, one or more lane position factors; and weighing the lane position factors using a defined weighted factor to obtain the lane accuracy.

In yet another form, the lane detection method further includes selecting the defined weighted factor for each of the one or more estimated lane trajectories based on one or more drive conditions.

In one form, the one or more lane position factors includes at least one of a lateral offset, a heading offset, curvature, and a derivative curvature.

In another form, when multiple adjacent vehicles are determined to be traveling in vicinity of the subject vehicle, the method further comprises: defining a potential vehicle trajectory for each of the adjacent vehicles; determining whether at least one of the adjacent vehicles is deviating from a curvature of the road, other adjacent vehicle, or both; assigning a lane confidence index to each potential vehicle trajectory in accordance with predefined lane criteria in response to at least one of the adjacent vehicles deviating; and selecting the vehicle trajectory from among the potential vehicle trajectories based on the lane confidence index.

In yet another form, the lane detection method further includes defining a road trajectory based on the road information. The estimated lane trajectory includes the road trajectory.

In one form, the present disclosure is directed toward a lane detection method that includes: acquiring road information for a section of a road upon which a subject vehicle is traveling; determining whether one or more adjacent vehicles are traveling in vicinity of the subject vehicle by way of a plurality of object detectors arranged along the subject vehicle; defining, in response to determining the presence of the one or more adjacent vehicles, a potential vehicle trajectory for each of the adjacent vehicles based on movement of the adjacent vehicle and the road information; selecting a vehicle trajectory from among one or more potential vehicle trajectories; detecting one or more lane markings along the road based on data from the plurality of object detectors; defining a lane marking trajectory in response to detecting the one or more lane markings; calculating one or more lane position factors for one or more estimated lane trajectories, where the one or more estimated lane trajectories includes the vehicle trajectory, the lane marking trajectory, or a combination thereof; weighing the lane position factors using a defined weighted factor for a given estimated lane trajectory to obtain a lane accuracy for the given estimated lane trajectory; and selecting a drive lane from among the one or more estimated lane trajectories based on the lane accuracies.

In another form, the lane detection method further includes determining a location of the subject vehicle. The road information is acquired from a road map repository based on the location of the subject vehicle.

In yet another form, the lane detection method further includes monitoring a position of the subject vehicle within the drive lane to determine whether the subject vehicle departs from the drive lane.

In one form, the lane detection method further includes controlling position of the subject vehicle within the drive lane.

In another form, the selecting the vehicle trajectory further includes: determining whether at least one of the adjacent vehicles is deviating from a curvature of the road, other adjacent vehicle, or both based on the road information and the one or more potential vehicle trajectories; assigning a lane confidence index to each of the potential vehicle trajectories in accordance with predefined lane criteria in response to at least one of the adjacent vehicles deviating; and selecting the vehicle trajectory from among the potential vehicle trajectories based on the lane confidence index.

In yet another form, the lane detection method further includes selecting the defined weighted factor for each of the one or more estimated lane trajectories based on one or more drive conditions.

In one form, the one or more lane position factors includes at least one of a lateral offset, a heading offset, curvature, and a derivative curvature.

In another form, the lane detection method further includes defining a road trajectory based on the road information. The estimated lane trajectories includes the road trajectory.

In one form, the present disclosure is directed toward a vehicular lane detection system that includes: a plurality of object detectors arranged about a subject vehicle to detect one or more objects external of the subject vehicle; a vehicular position detector operable to acquire a location of the subject vehicle; a road map repository configured to store road information regarding a plurality of roads, where the road information includes at least one of navigational maps and road characteristics; and a controller configured to determine a drive lane of the subject vehicle based on data from the object detectors, the vehicular position detector, the road map repository, or a combination thereof. The controller is configured to include: a road identification module configured to acquire road information from the road map repository for a section of a road upon which the subject vehicle is traveling based on the position of the subject vehicle detected by the vehicular position detector; a vehicle trajectory detector configured to detect an adjacent vehicle traveling along the road upon which the subject vehicle is traveling based on data from the object detectors and determine a vehicle trajectory in response to detecting the adjacent vehicle; a lane marking detector configured to detect lane markings along the road upon which the subject vehicle is traveling based on data from object detectors and define one or more lane marking trajectories based on the detected lane markings; and a lane selection module configured to select a drive lane from among one or more estimated trajectories based on a lane accuracy determined for each of the one or more estimated trajectories. The one or more estimated trajectories includes the vehicle trajectory, the one or more lane marking trajectories, or a combination thereof.

In another form, the lane selection module is configured to: calculate, for each of the one or more estimated lane trajectories, one or more lane position factors, where the one or more lane position factors includes at least one of a lateral offset, a heading offset, a curvature, and a derivative curvature; and weigh the lane position factors using a defined weighted factor for a given estimated lane trajectory to obtain the lane accuracy for the given estimated lane trajectory, where the defined weighted factor is selected for each estimated lane trajectory based on one or more drive conditions.

In yet another form, the vehicle trajectory detector is configured to: define a potential vehicle trajectory for each adjacent vehicle in response to detecting multiple adjacent vehicles; determine whether at least one of the adjacent vehicles is deviating from a curvature of the road, other adjacent vehicle, or both; assign a lane confidence index to each potential vehicle trajectory in accordance with predefined lane criteria in response to at least one of the adjacent vehicles deviating; and select the vehicle trajectory from among the potential vehicle trajectories based on the lane confidence index.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
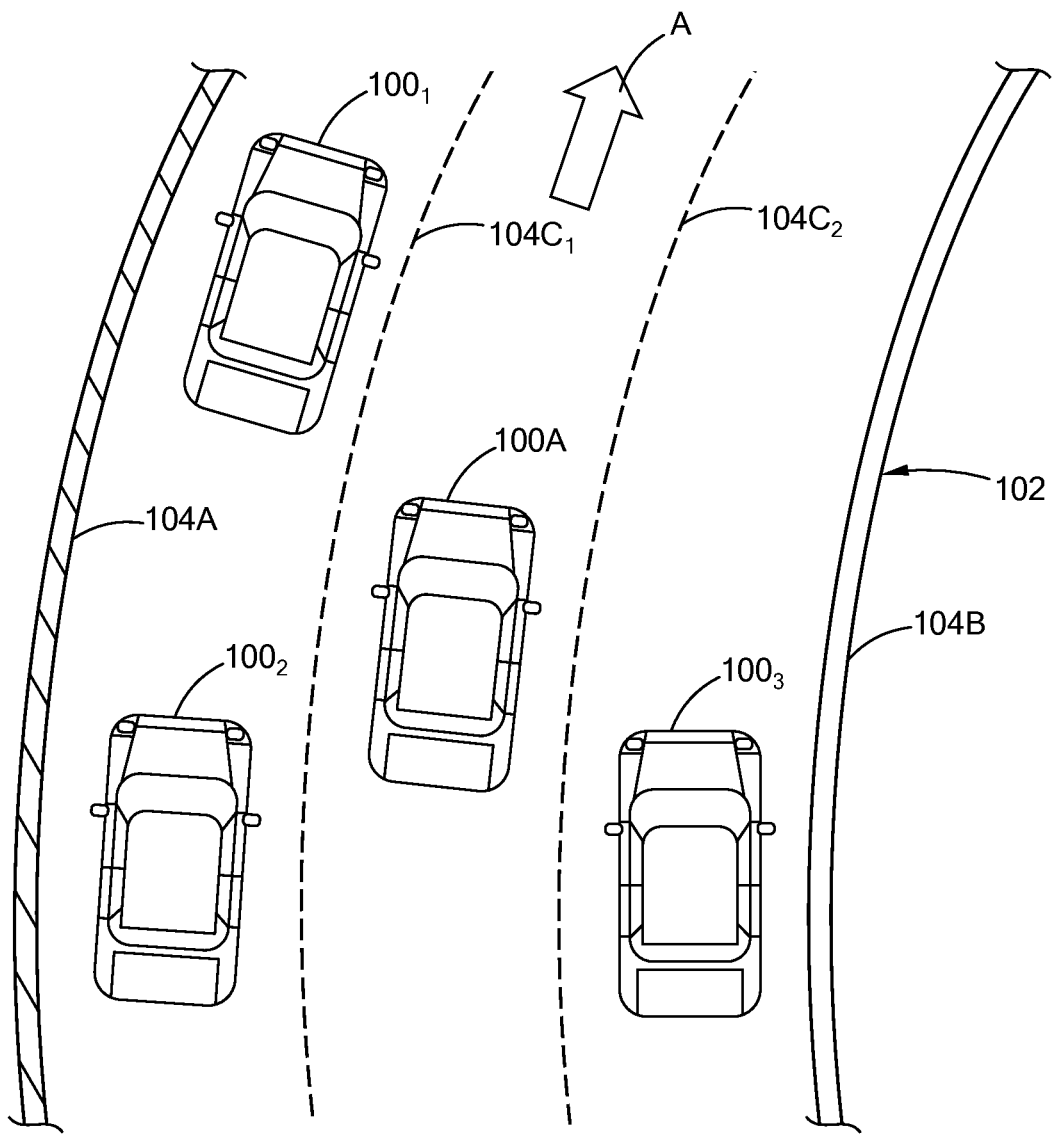
FIG. 1 illustrates a plurality of vehicles traveling along a road.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is directed toward a system for determining a drive lane of a vehicle using lane trajectories defined by data from different sources. More specifically, the system utilizes data from sensors disposed about the vehicle to detect adjacent vehicles, lane markings along the road upon which the vehicle is traveling, and even a location of the vehicle. Data from the sensors are used to define trajectories, such as a vehicle trajectory, a lane marking trajectory, and/or a road trajectory. The trajectories are then analyzed in accordance with predefined weighted factors to ascertain the drive lane of the vehicle. As described further here, the system does not rely solely on the lane markings provided along the road to define a lane that the vehicle is traveling along.

Referring to FIG. 1, in one example, multiple vehicles 100 (I.e., 100$_1$, 100$_2$, 100$_3$, and 100A in figure) travel along a road 102 having defined lane markings in a direction represented by arrow A. While the vehicles 100 are illustrated as a four-wheel automobile, the present disclosure is also applicable to other suitable vehicles, such as motorcycles, buses, trucks. As known, different lane markings provided along the road convey different information, such as travel lane, travel direction of the vehicle, and whether passing is allowed. For example, in the United States, yellow lines separate traffic traveling in opposite directions and generally indicate that the driver should stay to the right of the yellow lines. A solid yellow line, represented by reference number 104A, indicates that passing is prohibited, whereas a dashed yellow line indicates that passing is allowed. A solid white line, represented by reference number 104B, generally indicates that lane changes are discouraged and dashed white lines, represented by reference numbers $104C_1$ and $104C_2$, indicate lane changes are allowed. It should be readily understood that the teachings of the present disclosure are applicable to other lane markings and even lane marking of other countries while remaining within the scope of the present disclosure. In the following, lane markings 104A, 104B, $104C_1$ and $104C_2$ may be collectively referred to as lane markings 104.

Figure 2:
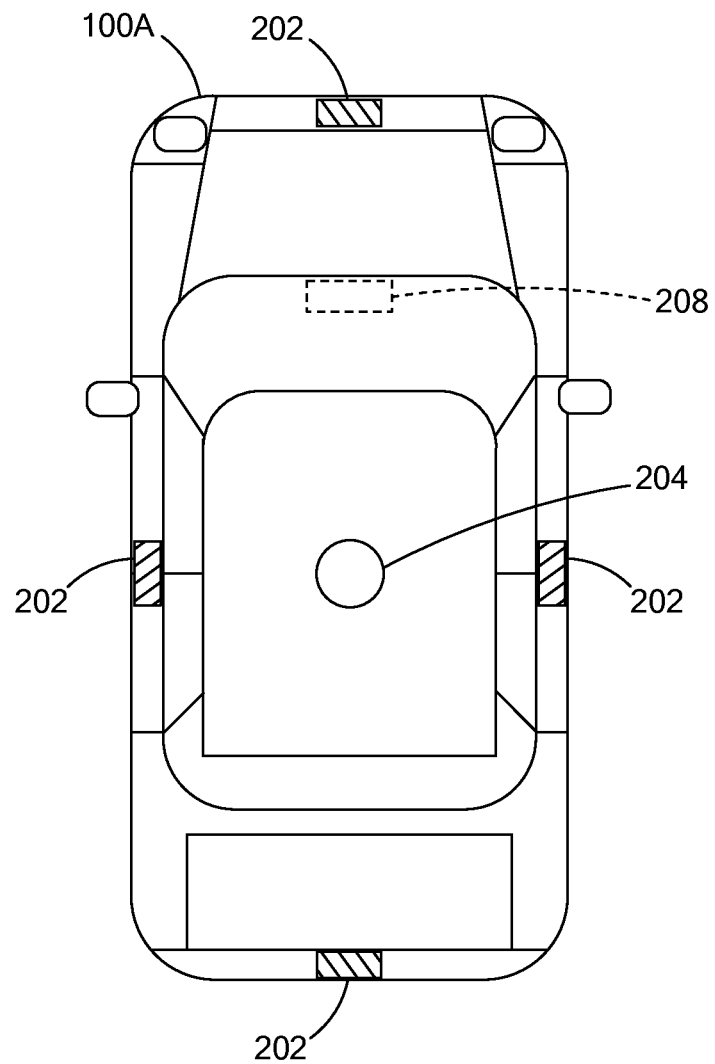
FIG. 2 illustrates a subject vehicle having a lane detection system in accordance with the teachings of the present disclosure.
Figure 3:
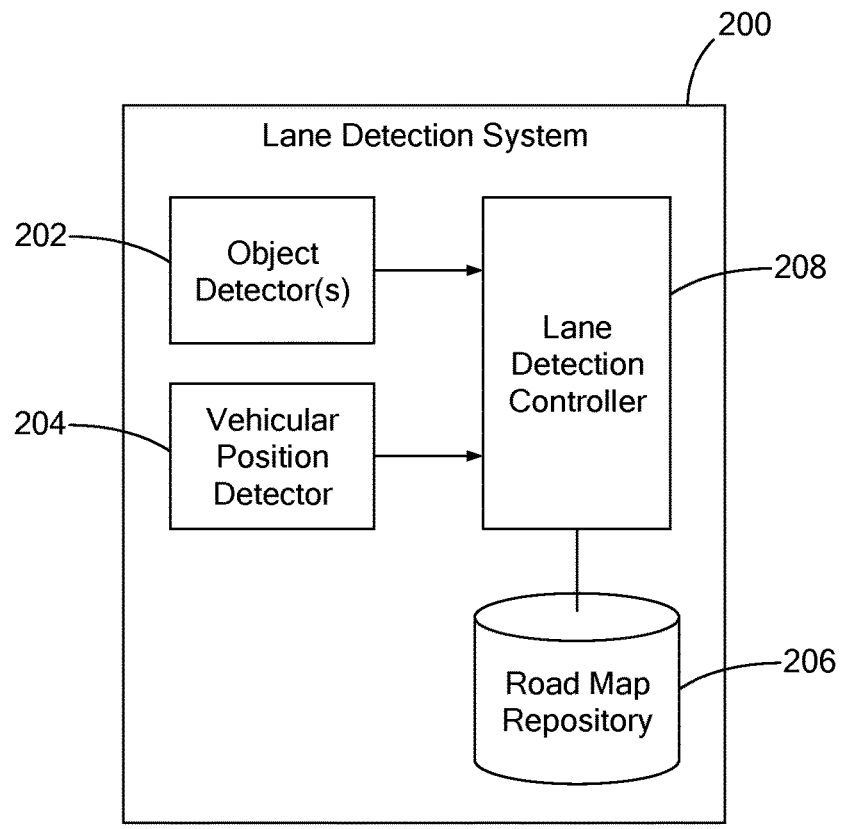
FIG. 3 is a block diagram of the lane detection system in accordance with the teachings of the present disclosure.

Referring to FIGS. 2 and 3, a subject vehicle 100A from among the vehicles 100 includes a lane detection system 200 for determining a driving lane of the subject vehicle 100A. In one form, the lane detection system 200 include one or more object detectors 202 disposed along a body of the subject vehicle 100A, a vehicular position detector 204, a road map repository 206, and a lane detection controller 208.

The object detectors 202 monitor the environment around the subject vehicle 100A by detecting and in some cases, mapping position of various objects around the vehicle 100A. For example, the object detectors 202 are operable to detect objects such as lane markings 104, other vehicles 100, pedestrians, vegetation, and/or road barriers. In one form, the object detectors 202 may include a radar, a camera, a lidar, an ultrasonic sensor, and/or a combination thereof. It should be readily understood that other suitable object detectors may also be used, and are within the scope of the present disclosure.

The vehicular position detector 204 determines a location of the subject vehicle 100A. In one form, the vehicular position detector 204 may be a global positioning service (GPS) device that includes a GPS antenna. Based on the location of the subject vehicle 100A, the system 200 can determine the road upon which the vehicle is traveling, and acquire additional information from the road map repository 206.

More particularly, in one form, the road map repository 206 is a datastore having memory for storing various navigational maps that illustrate, for example, roads, transit routes, point of interest, and other suitable information. For the various roads, the road map repository 206 also stores road characteristics, such as road curvature, road height, traffic direction (e.g., one-way travel, or two-way), and/or number of lanes along the road. In the following, the navigational maps and road characteristics may be collectively referred to as road information. The road map repository 206 may be provided within the subject vehicle 100A, and can be updated by the original equipment manufacturer. In another example, the road map repository 206 may be disposed at an external server and communicably coupled to the other components of the system 200 via a wireless communication link. For example, the subject vehicle 100A may include a communication interface (not shown) that is configured to communicate with external devices via wireless communication. Accordingly, the location of the subject vehicle 100A can be transmitted to the external server having the road map repository 206, and the server may transmit road information (e.g., navigational maps and/or road characteristics) regarding a section of road upon which the subject vehicle 100A is travelling.

In one form, the lane detection controller 208 is configured to identify a drive lane of the subject vehicle 100A based on information from the object detectors 202, the vehicular position detector 204, and the road map repository 206. The identified drive lane can be used as part of: a lane departure warning system that notifies a vehicle user when the vehicle is drifting from the drive line; a lane keeping assist system that controls the position of the vehicle within the drive lane and can be part of an adaptive cruise control vehicle or safety feature of the vehicle; or a fully- or semi-autonomous vehicle system.

In one form, the lane detection controller 208 includes electronics including one or more microprocessors and memory (e.g., RAM, ROM, etc.) that stores computer readable instructions (i.e., software programs) executed by the microprocessor(s). The lane detection controller 208 is configured by way of predefined computer readable instructions to perform one or more control processes described herein.

Figure 4:
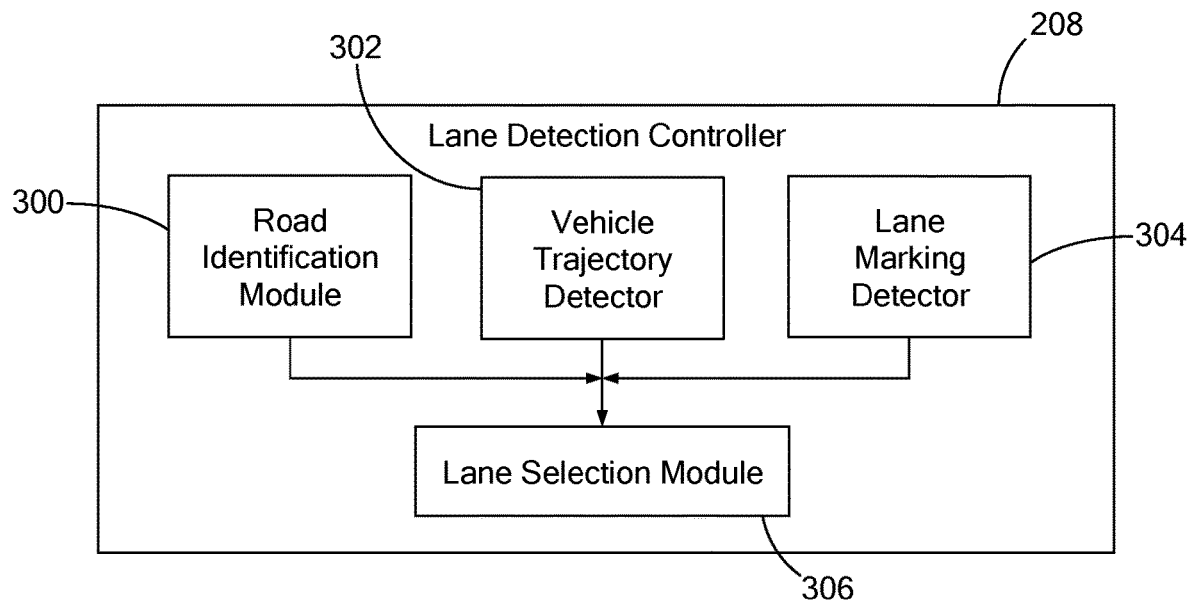
FIG. 4 is a block diagram of a lane detection controller in accordance with the teachings of the present disclosure.

Referring to FIG. 4, in one form, the lane detection controller 208 is configured to operate as a road identification module 300, a vehicle trajectory detector 302, a lane marking detector 304, and a lane selection module 306. The road identification module 300 is configured to acquire road information for a section of the road upon which the subject vehicle 100A is traveling. More particularly, the road identification module 300 retrieves the location of the subject vehicle 100A from the vehicular position detector 204, and then retrieves road information, such as navigational map(s) and road characteristics, for a section of the road that the vehicle 100A is traveling on. Based on the information retrieved, the road identification module 300 may define a road trajectory. The section of road may be predefined as a certain distance in front of the subject vehicle (e.g., 200 yards, 0.5 mile, 1 mile), and may also include a distance behind the vehicle that is less than the distance in front of the subject vehicle 100A (e.g., 10-yds, 50-feet).

The vehicle trajectory detector 302 is configured to track the trajectory of one or more vehicles traveling adjacent to the subject vehicle 100A, and selects a vehicle trajectory for the subject vehicle 100A based on tracked trajectories. More particularly, using data from the object detectors 202, the vehicle trajectory detector 302 determines whether an adjacent vehicle is present, and defines a potential trajectory for each identified adjacent vehicle. For example, in one form, the object detectors 202 emit a signal have predefined properties (e.g., frequency, waveform, amplitude, etc.), and receives a signal that is reflected off an object, such as a vehicle. The vehicle trajectory detector 302 is configured to analyze the signals transmitted and received to determine whether an object is present and if so, determines one or more properties of the object, such as the type of object, the distance of the object from the subject vehicle 100A, the position of the object relative to the subject vehicle 100A, and/or speed of the object. In one form, the object detectors 202 continuously emit and receive signals, such that vehicle trajectory detector 302 is able to define a potential trajectory of a vehicle traveling adjacent to the subject vehicle.

An adjacent vehicle can be any vehicle traveling around the subject vehicle and substantially in the same direction. For example, referring to FIG. 1, vehicles $100_1$, $100_2$, and $100_3$ may be identified as an adjacent vehicle to the subject vehicles 100A. In another example, if the vehicle $100_3$ is the subject vehicle, vehicles $100_1$ and $100_2$ can be identified as adjacent vehicles if a reflected signal is received from them even though a lane separates them from vehicle $100_3$. While FIG. 1 does not illustrate a vehicle in front of or behind the subject vehicle 100A, it should be readily understood that such vehicles could be considered adjacent vehicles.

Once an adjacent vehicle is detected, the vehicle trajectory detector 302 defines a vehicle trajectory for that vehicle and for the subject vehicle 100A. Using the road information acquired by the road identification module 300 and/or the defined road trajectory, the vehicle trajectory detector 302 determines whether a vehicle trajectory for a given vehicle is similar or follows the contour of the road and/or the vehicle trajectory of another adjacent vehicle. In other words, the vehicle trajectory detector 302 determines if any one of the vehicles 100, including the subject vehicle 100, is deviating from the trajectory of the other vehicle and/or the curvature of the road as defined by the vehicle information. Based on the vehicle trajectories and the curvature of the road, the vehicle trajectory detector 302 identifies varying trajectories as a potential trajectory for the subject vehicle. For example, referring to FIG. 1, if vehicle trajectory of vehicle $100_1$ deviates from that of vehicles $100_2$ and $100_3$ and the road, and the other vehicles have a similar trajectory with each other and the road; whereas vehicle $100_1$ is different. Accordingly, the vehicle trajectory detector 302 identifies the vehicle trajectory of vehicle $100_1$ as a first potential trajectory and identifies of the other vehicles and the road as a second potential trajectory.

Using predefined lane criteria, the vehicle trajectory detector 302 then assigns a lane confidence index to each potential trajectory. In one form, the predefined lane criteria are designed to give deference to the curvature of the road. Meaning, a potential trajectory that matches the curvature of the road has a higher lane confidence index than a potential trajectory that does not match. For example, if a first potential trajectory matches the road curvature and a second potential trajectory does not match the road curvature, the first potential trajectory is assigned a higher lane confidence index than that of the second potential trajectory. In addition, the predefined lane criteria may consider the number of vehicles following a particular potential trajectory. For example, if the number of vehicles following a first potential trajectory is greater than a second potential trajectory, the first potential trajectory is assigned a higher lane confidence index than the second potential trajectory. Other lane criteria can be used for assigning the lane confidence index, and should not be limited to the examples provided herein.

The lane marking detector 304 is configured to detect lane markings along the road and define one or more lane marking trajectories based on the detected markings. Using data from the object detectors 202, the lane selection module 306 determines whether lane markings are provided along the road, and then defines the lane marking trajectory for the markings. Referring to FIG. 1, the lane markings are not limited to the markings directly next to the subject vehicle 100A, such as markings $104C_1$ and $104C_2$, but can include the other markings like 104A and/or 104B. In one form, the lane marking detector 304 defines a lane marking trajectories that coincide with the travel direction of the subject vehicle 100A. In addition to the actual trajectory, the lane marking detector 304 is configured to establish the position of the lane marking relative to the subject vehicle 100A to assess which markings define the lane that the subject vehicle 100A is traveling within.

Using the road trajectory, the vehicle trajectory selected by the vehicle trajectory detector 302, and/or the lane marking trajectories defined by the lane marking detector 304, the lane selection module 306 is configured to define the drive lane of the subject vehicle 100A. More particularly, the road trajectory, the selected vehicle trajectory, and/or the lane marking trajectories are provided as estimated lane trajectories. In one form, for each estimated lane trajectory, the lane selection module 306 calculates one or more position factors relative to the subject vehicle 100A. The lane position factors include but are not limited to distance between the subject vehicle's left and/or right side to the left and/or right lane edge (i.e., lateral offset), angular difference between the direction of the subject vehicle and curvature of the road (i.e., heading offset or heading angle), curvature of the trajectory, and/or derivative curvature. Various mathematical models maybe used to determine the lane position factors.

In one form, the lane selection module 306 evaluates the lane position factors in accordance with a predefined statistical distribution to assess the accuracy of the calculated value. For example, a Gaussian distribution is used to determine a statistical factor (e.g., Gaussian offset) for each of the lane position factors for each estimated trajectory. The lane selection module 306 then determines a lane accuracy for each of the estimated trajectories by assigning each estimated trajectory a weighted factor. More particularly, the statistical factor for each lane position factor is multiplied by the assigned weighted factor, and a lane accuracy of a given estimated trajectory is provided as the sum of the weighted statistical factors. In one form, the lane selection module 306 includes a look-up table that associates various environmental conditions with weighted factors for the different trajectories. The sum of the weighted factors is one.

In one form, the lane selection module 306 assigns the weighted factor based on one or more environmental conditions, such as time of day, weather, location, and/or other conditions. That is, the environmental conditions take into consideration varying factors that can influence detection of, for example, adjacent vehicles, lane markings, location. For example, if the weather is ideal for capturing image of lane markings (e.g., daylight, sunny, dry roads, and no fog), the estimated trajectories that are based on the lane marking are assigned a higher weighted factor than the vehicle trajectory and the road trajectory. Conversely, if it is dark outside and/or the location of the subject vehicle is in an area that does not have lane markings, then the vehicle trajectory is assigned a higher weighted factor than that of the lane marking trajectories. In one form, the lane selection module 306 receives information regarding the environmental conditions from sensors and/or other controllers disposed in the subject vehicle. For example, the lane detection controller 208 is configured to communicate with sensors and other controllers via a vehicle network (e.g., control area network (CAN) and local interconnect network (LIN)).

In one form, the lane selection module 306 selects the estimated trajectory having the highest lane accuracy as the drive lane of the subject vehicle 100A. Once selected, the drive lane may be used to monitor the position of the subject vehicle 100A within the drive lane as part of a lane departure system or even control the position of the subject vehicle as part of a fully- or semi-autonomous vehicle control system.

The lane detection system of the present disclosure utilizes information from other source to define the drive lane of the subject vehicle. That is, along with the lane markings, the lane detection system determines the drive lane based on other vehicles, and road information. Thus, improving the accuracy of the defined drive lane.

Figure 6:
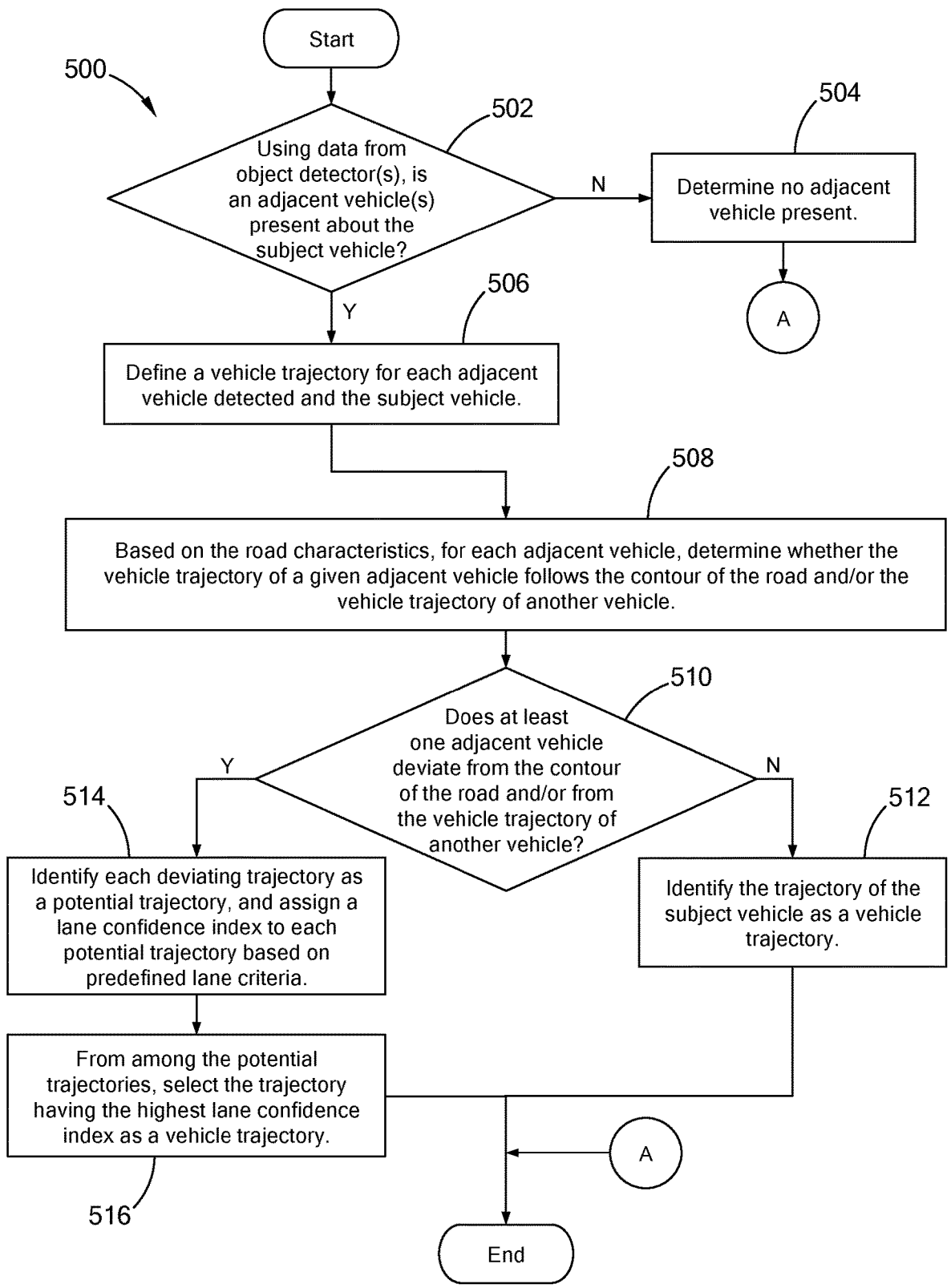
FIG. 6 is a flowchart of a vehicle lane detection routine in accordance with the teachings of the present disclosure.
Figure 7:
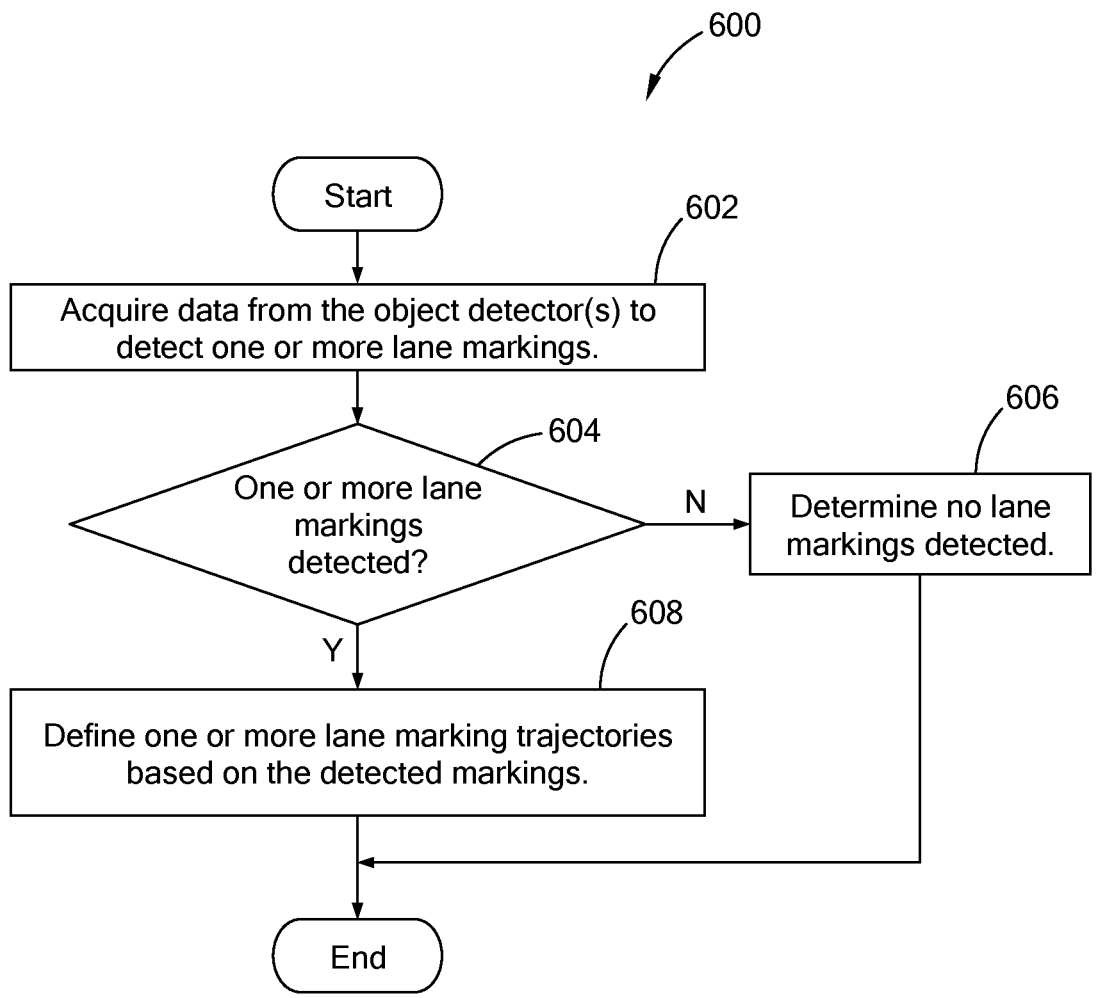
FIG. 7 is a flowchart of a lane marking detection routine in accordance with the teachings of the present disclosure.
Figure 8:
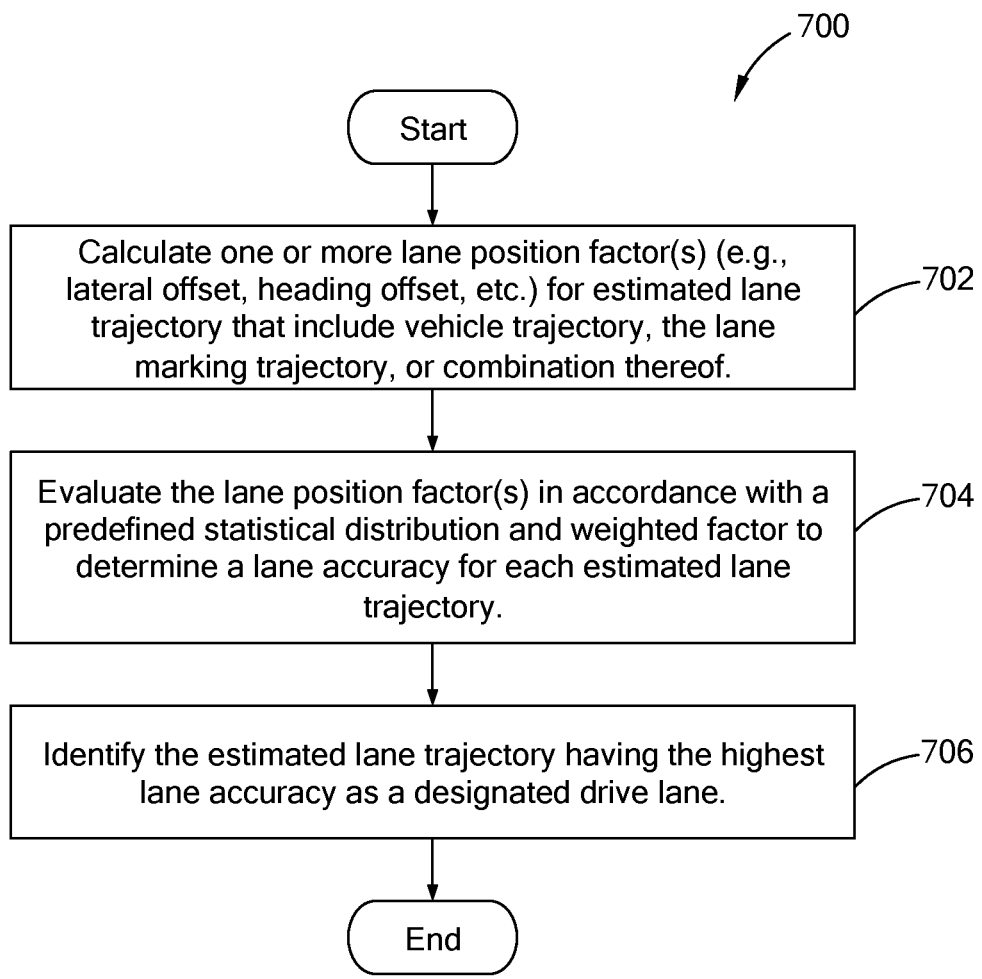
FIG. 8 is a flowchart of a lane selection routine in accordance with the teachings of the present disclosure.

Referring to FIGS. 5-8, an example lane detection routine is provided for selecting a drive lane for a subject vehicle having the lane detection system. In one form, the lane detection controller performs the routines when the subject vehicle begins to move. The lane detection routine includes a road detection routine 400 (FIG. 5), a vehicle lane detection routine 500 (FIG. 6), a lane marking detection routine 600 (FIG. 7), and a lane selection routine 700 (FIG. 8).

Figure 5:
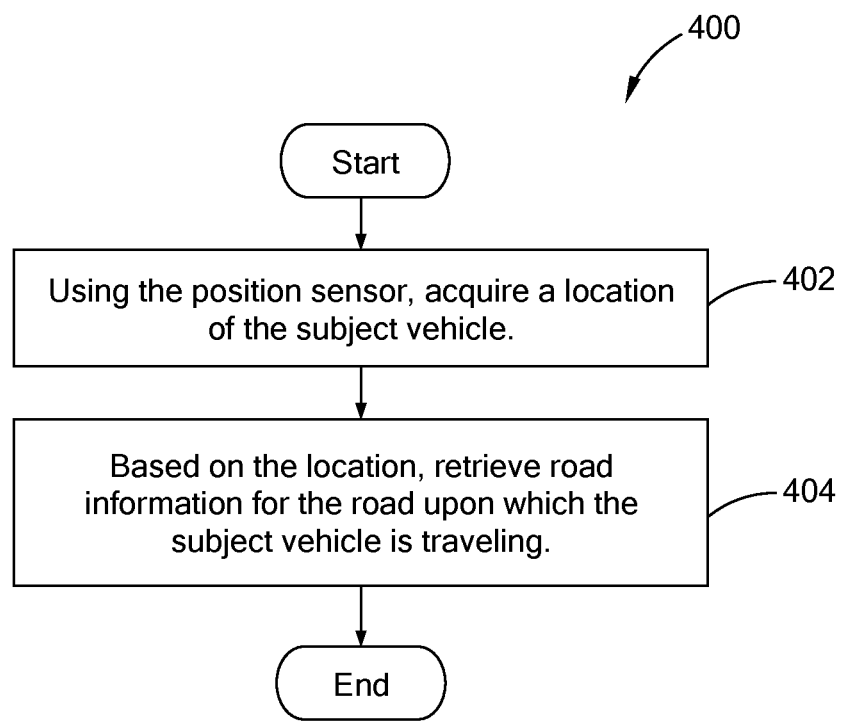
FIG. 5 is flowchart of a road detection routine in accordance with the teachings of the present disclosure.

Referring to FIG. 5, at 402, the controller is configured to acquire a location of the subject vehicle from the vehicular position detector. At 404, the controller retrieves road information, such as road characteristics and navigation map(s), for the road upon which the subject vehicle is traveling, and defines a road trajectory. In one form, the road information is retrieved from the road map repository.

Referring to FIG. 6, at 502, the controller determines whether one or more adjacent vehicles are present about the subject vehicle based on data from the object detectors. If no, the controller determines no adjacent vehicles, at 504, and the routine ends. If yes, the controller defines a vehicle trajectory for each adjacent vehicle and the subject vehicle, at 506. The controller, at 508, analyzes the vehicle trajectory of a given adjacent vehicle to assess whether the given vehicle is following the contour of the road and/or the vehicle trajectory of another vehicle. That is, the controller analyzes the vehicles' trajectories and the road information to determine if a vehicle is deviating from the other vehicles and/or the road. At 510, the controller determines if at least one adjacent vehicle deviates from the road and/or the other vehicle trajectories. If no, the controller, at 512, identifies the trajectory of the subject vehicle as a vehicle trajectory. If yes, the controller, at 514, identifies each deviating trajectory as a potential trajectory, and assigns a lane confidence index to each potential trajectory based on predefined lane criteria. At 516, the controller selects the potential trajectory having the highest lane confidence index, as a vehicle trajectory.

Referring to FIG. 7, at 602, the controller acquires data from the object detectors to detect one or more lane markings. At 604, the controller determines if one or more lane markings are detected. If no, the controller determines no lane markings available, at 606, and the routine ends. If yes, the controller defines one or more lane marking trajectories based on the detected markings, at 608.

Referring to FIG. 8, the controller calculates one or more lane position factors for each estimated lane trajectory (i.e., road trajectory, vehicle trajectory, and/or lane marking trajectory), at 702. The controller, at 704, evaluates the lane position factors in accordance with a predefined statistical distribution and weighted factor to determine a lane accuracy for each estimated lane trajectory as described above. The controller then identifies the estimated lane trajectory having the highest lane accuracy as a designated drive lane, at 706. As discussed above, the drive lane can be used as part of another vehicle system, such as a lane departure warning system and an autonomous control system. It should be readily understood that the routines of FIGS. 5-8 are example processes, and that other processes may be used for selecting the drive lane in accordance with the teachings of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C OR combination thereof), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A lane detection method comprising:
acquiring road information for a section of a road upon which a subject vehicle is traveling;
determining whether an adjacent vehicle is traveling in vicinity of the subject vehicle;
defining, in response to determining a presence of the adjacent vehicle, a vehicle trajectory of the adjacent vehicle based on movement of the adjacent vehicle and the road information;
detecting one or more lane markings along the road upon which the subject vehicle is traveling;
defining a lane marking trajectory in response to detecting the one or more lane markings;
calculating a lane accuracy for each of one or more estimated lane trajectories, wherein the one or more estimated lane trajectories includes the vehicle trajectory, the lane marking trajectory, or a combination thereof;
selecting a drive lane from among the one or more estimated lane trajectories based on the lane accuracy, wherein when multiple adjacent vehicles are determined to be traveling in vicinity of the subject vehicle, the method further comprises:
defining a potential vehicle trajectory for each of the adjacent vehicles;
determining whether at least one of the adjacent vehicles is deviating from a curvature of the road, other adjacent vehicle, or both;
assigning a lane confidence index to each potential vehicle trajectory in accordance with predefined lane criteria in response to at least one of the adjacent vehicles deviating; and
selecting the vehicle trajectory from among the potential vehicle trajectories based on the lane confidence index.

2. The lane detection method of claim 1 further comprising determining a location of the subject vehicle, wherein the road information is acquired from a road map repository based on the location of the subject vehicle.

3. The lane detection method of claim 1 further comprising monitoring a position of the subject vehicle within the drive lane to determine whether the subject vehicle departs from the drive lane.

4. The lane detection method of claim 1 further comprising controlling position of the subject vehicle within the drive lane.

5. The lane detection method of claim 1, wherein the calculating the lane accuracy further comprises:
calculating, for each of the one or more estimated lane trajectories, one or more lane position factors; and
weighing the lane position factors using a defined weighted factor to obtain the lane accuracy.

6. The lane detection method of claim 5 further comprising selecting the defined weighted factor for each of the one or more estimated lane trajectories based on one or more drive conditions.

7. The lane detection method of claim 5, wherein the one or more lane position factors includes at least one of a lateral offset, a heading offset, curvature, and a derivative curvature.

8. The lane detection method of claim 1 further comprising defining a road trajectory based on the road information, wherein the one or more estimated lane trajectories include the road trajectory.

9. A lane detection method comprising:
acquiring road information for a section of a road upon which a subject vehicle is traveling;
determining whether one or more adjacent vehicles are traveling in vicinity of the subject vehicle by way of a plurality of object detectors arranged along the subject vehicle;
defining, in response to determining a presence of the one or more adjacent vehicles, a potential vehicle trajectory for each of the adjacent vehicles based on movement of the adjacent vehicle and the road information;
selecting a vehicle trajectory from among one or more potential vehicle trajectories;
detecting one or more lane markings along the road based on data from the plurality of object detectors;
defining a lane marking trajectory in response to detecting the one or more lane markings;
calculating one or more lane position factors for one or more estimated lane trajectories, wherein the one or more estimated lane trajectories includes the vehicle trajectory, the lane marking trajectory, or a combination thereof;
weighing the lane position factors using a defined weighted factor for a given estimated lane trajectory to obtain a lane accuracy for the given estimated lane trajectory, and
selecting a drive lane from among the one or more estimated lane trajectories based on the lane accuracies.

10. The lane detection method of claim 9 further comprising determining a location of the subject vehicle, wherein the road information is acquired from a road map repository based on the location of the subject vehicle.

11. The lane detection method of claim 9 further comprising monitoring a position of the subject vehicle within the drive lane to determine whether the subject vehicle departs from the drive lane.

12. The lane detection method of claim 9 further comprising controlling position of the subject vehicle within the drive lane.

13. The lane detection method of claim 9, wherein the selecting the vehicle trajectory further comprises:
determining whether at least one of the adjacent vehicles is deviating from a curvature of the road, other adjacent vehicle, or both based on the road information and the one or more potential vehicle trajectories;
assigning a lane confidence index to each of the potential vehicle trajectories in accordance with predefined lane criteria in response to at least one of the adjacent vehicles deviating; and
selecting the vehicle trajectory from among the potential vehicle trajectories based on the lane confidence index.

14. The lane detection method of claim 9 further comprising selecting the defined weighted factor for each of the one or more estimated lane trajectories based on one or more drive conditions.

15. The lane detection method of claim 9, wherein the one or more lane position factors includes at least one of a lateral offset, a heading offset, curvature, and a derivative curvature.

16. The lane detection method of claim 9 further comprising defining a road trajectory based on the road information, wherein the estimated lane trajectories includes the road trajectory.

17. A vehicular lane detection system comprising:
a plurality of object detectors arranged about a subject vehicle to detect one or more objects external of the subject vehicle;
a vehicular position detector operable to acquire a location of the subject vehicle;
a road map repository configured to store road information regarding a plurality of roads, wherein the road information includes at least one of navigational maps and road characteristics; and
a controller configured to determine a drive lane of the subject vehicle based on data from the object detectors, the vehicular position detector, the road map repository, or a combination thereof, the controller being configured to include:
a road identification module configured to acquire road information from the road map repository for a section of a road upon which the subject vehicle is traveling based on the location of the subject vehicle detected by the vehicular position detector,
a vehicle trajectory detector configured to detect an adjacent vehicle traveling along the road upon which the subject vehicle is traveling based on data from the object detectors and determine a vehicle trajectory of the adjacent vehicle in response to detecting the adjacent vehicle,
a lane marking detector configured to detect lane markings along the road upon which the subject vehicle is traveling based on data from object detectors and define one or more lane marking trajectories based on the detected lane markings,
a lane selection module configured to select a drive lane from among one or more estimated trajectories based on a lane accuracy determined for each of the one or more estimated trajectories, wherein the one or more estimated trajectories includes the vehicle trajectory, the one or more lane marking trajectories, or a combination thereof, wherein the vehicle trajectory detector is configured to:
define a potential vehicle trajectory for each adjacent vehicle in response to detecting multiple adjacent vehicles;
determine whether at least one of the adjacent vehicles is deviating from a curvature of the road, other adjacent vehicle, or both;
assign a lane confidence index to each potential vehicle trajectory in accordance with predefined lane criteria in response to at least one of the adjacent vehicles deviating; and
select the vehicle trajectory from among the potential vehicle trajectories based on the lane confidence index.

18. The vehicular lane detection system of claim 17, wherein the lane selection module is configured to:
calculate, for each of the one or more estimated lane trajectories, one or more lane position factors, wherein the one or more lane position factors includes at least one of a lateral offset, a heading offset, a curvature, and a derivative curvature, and
weigh the lane position factors using a defined weighted factor for a given estimated lane trajectory to obtain the lane accuracy for the given estimated lane trajectory, wherein the defined weighted factor is selected for each estimated lane trajectory based on one or more drive conditions.

* * * * *